(12) United States Patent
Akiyama

(10) Patent No.: US 6,271,182 B1
(45) Date of Patent: Aug. 7, 2001

(54) ROLLING DEVICE FOR INFORMATION APPARATUS

(75) Inventor: Motoharu Akiyama, Nagano-ken (JP)

(73) Assignee: Minebea Co., Ltd, Nagano-ken (JP)

( * ) Notice: Subject to any disclaimer, the term of this patent is extended or adjusted under 35 U.S.C. 154(b) by 0 days.

(21) Appl. No.: 09/537,989

(22) Filed: Mar. 29, 2000

(30) Foreign Application Priority Data

Nov. 13, 1999 (JP) .................................................. 11-359607

(51) Int. Cl.[7] ...................... C10M 135/18; C10M 105/48
(52) U.S. Cl. ........................ 508/364; 508/365; 508/379; 508/462; 508/539
(58) Field of Search .................... 508/462, 363, 508/364, 365

(56) References Cited

U.S. PATENT DOCUMENTS

| | | | | |
|---|---|---|---|---|
| 2,739,127 | * | 3/1956 | Morway et al. ........................ | 508/462 |
| 2,758,975 | * | 8/1956 | Cottle et al. ............................ | 508/462 |
| 2,871,191 | * | 1/1959 | Schott .................................... | 508/462 |
| 3,642,858 | * | 2/1972 | Frevel et al. ........................... | 508/462 |
| 5,009,803 | * | 4/1991 | Brandolese ............................. | 508/462 |
| 5,348,402 | * | 9/1994 | Porter .................................... | 384/462 |
| 5,387,374 | * | 2/1995 | Westfechtel et al. .................. | 508/462 |
| 5,585,336 | * | 12/1996 | Ozaki et al. ........................... | 508/365 |
| 5,607,906 | * | 3/1997 | Okaniwa et al. ...................... | 508/168 |
| 5,672,571 | * | 9/1997 | Hatekeyama et al. ................ | 508/321 |
| 5,747,432 | * | 5/1998 | Hayashi et al. ....................... | 508/462 |
| 6,022,835 | * | 2/2000 | Fletcher ................................. | 508/365 |

FOREIGN PATENT DOCUMENTS

| | | |
|---|---|---|
| 10-176719 | 6/1998 | (JP) . |
| 10-339326 | 12/1998 | (JP) . |
| 11-13769 | 1/1999 | (JP) . |

\* cited by examiner

Primary Examiner—Ellen M. McAvoy
(74) Attorney, Agent, or Firm—Flynn, Thiel, Boutell & Tanis, P.C.

(57) ABSTRACT

A rolling device is made up of a plurality of rolling bodies provided between an outer member having a first contact face with each of the plurality of rolling bodies and an inner member having a second contact face with each of the plurality of rolling bodies wherein the plurality of rolling bodies individually are able to roll relative to the first and second faces. A grease composition is sealedly filled in between the outer member and the inner member and contains a carbonate compound serving as a base oil, a lithium soap serving as a thickener, and at least one organomolybdenum compound selected from the group consisting of a molybdenum dithiophosphate and a molybdenum dithiocarbamate.

14 Claims, 1 Drawing Sheet

ROLLING DEVICE FOR INFORMATION APPARATUS

BACKGROUND OF THE INVENTION

1. Field of the Invention

This invention relates to a bearing or rolling device which is adapted for use in spindle motors widely employed in peripheral information devices such as HDD (hard disk drive) and FDD (floppy disk drive) memories, CDD (compact disk drive), MOD (magneto-optical disk drive) and the like of computer systems, and VTR (video tape recorder).

2. Description of the Prior Art

In general, performances required for bearings, which are employed in peripheral information devices such as HDD (hard disk drive) and FDD (floppy disk drive) memories, CDD (compact disk drive), MOD (magneto-optical disk drive) and the like of computer systems, and VTR (video tape recorder), include a small torque, an excellent acoustic property, a long life, a reduced degree of dusting or scattering of grease, and the like.

Especially, with these information devices usually employed in a clean environment, it has been often experienced that a gaseous oil or fine particles of a grease scattered from the inside of a bearing at the time of rotation often cause the surfaces of a disk or the like to be contaminated, resulting in a malfunction of the device. Thus, it has been accepted as important the suppression of the amount of the scattered oil or grease. We have made extensive studies on this.

In recent years, a more serious problem has been closed up: when rolling devices, such as rolling ball bearings, particular roller bearings used in information devices, undergo vibrations at a low frequency of about 5 to 10 Hz caused during the course of carrying out and in of information devices or at the time of carrying such devices, race faces with balls or rollers inside a bearing suffer damages and are degraded, thereby causing a so-called fretting phenomenon.

When fretting takes place, the acoustic characteristics of the rolling ball bearing or roller bearing not only are worsened, but also adversely influence the performance of the information device.

It is an object of the invention to provide a rolling device for information devices which has not only a high performance and a long life while suppressing the amount of an oil or grease scattered from the rolling device, but also does not cause a fretting phenomenon.

It is another object of the invention to provide a rolling device for information devices which can satisfy the properties required for bearings used in peripheral information devices such as HDD (hard disk drive) and FDD (floppy disk drive) memories, CDD (compact disk drive), MOD (magneto-optical disk drive) and the like of computer systems, and VTR (video tape recorder), i.e. a small torque, an excellent acoustic property, a long life, a reduced degree of dusting or scattering of grease or oil during the course of high revolutions, and the like, and also can suppress a fretting phenomenon from occurring.

The above objects can be achieved, according to the invention, by a rolling device which comprises a plurality of rolling bodies provided between an outer member having a first contact face with each of the plurality of rolling bodies and an inner member having a second contact face with each of the plurality of rolling bodies, the plurality of rolling bodies individually being able to roll relative to the first and second faces, wherein a grease composition is sealedly filled inbetween the outer member and the inner member and comprises:

a carbonate compound of the following general formula (i) serving as a base oil (i)

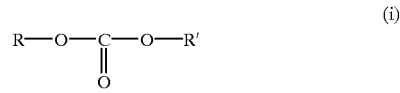

wherein R and R' may be the same or different and independently represent a branched alkyl group having from 13 to 15 carbon atoms;

a lithium soap serving as a thickener; and at least one organomolybdenum compound selected from the group consisting of a molybdenum dithiophosphate of the general formula (ii)

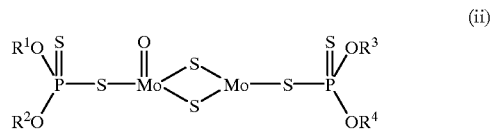

wherein $R^1$, $R^2$, $R^3$ and $R^4$ independently represent an alkyl group having from 1 to 24 carbon atoms or an aryl group having from 6 to 30 carbon atoms, and a molybdenum dithiocarbamate of the general formula (iii)

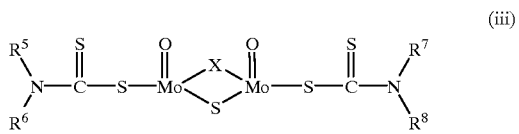

wherein $R^5$, $R^6$, $R^7$ and $R^8$ independently represent an alkyl group having from 1 to 24 carbon atoms, and X represents O or S.

BRIEF DESCRIPTION OF THE DRAWINGS

FIGS. 1a and 1b are, respectively, schematic sectional views showing a typical bearing for information devices wherein FIG. 1a shows the bearing for illustrating the general concept of the invention and FIG. 1b illustrates the inventive concept of a rolling device according to the invention using the bearing mentioned above

EMBODIMENTS OF THE INVENTION

In the practice of the invention, a rolling device for information devices means a bearing such as of a spindle motor or the like, which is usually employed in peripheral information devices such as HDD (hard disk drive) and FDD (floppy disk drive) memories, CDD (compact disk drive), MOD (magneto-optical disk drive) and the like of computer systems, and VTR (video tape recorder).

Figure 1A:
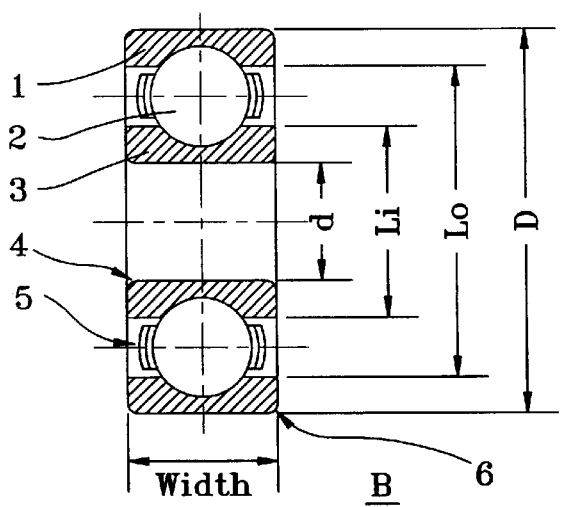
Figure 1B:
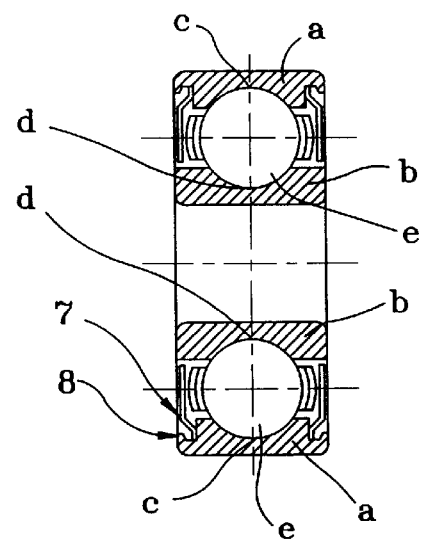

Now, reference is made to FIGS. 1a and 1b illustrating a rolling ball bearing, which is one of typical bearings.

FIG. 1b, (a) to (e), respectively, indicate an outer member, an inner member, a first contact face, a second contact face and a rolling body as defined in the instant invention.

In FIG. 1a, there is generally shown a bearing B including an outer ring 1, a ball 2, and an inner ring 3. The inner ring 3 is beveled at 4, and the outer ring 1 is likewise beveled at 6 as shown. Reference numeral 5 is a retainer.

The bearing B has a shield 7 and a snap ring 8 as is particularly shown in FIG. 1b. This arrangement of the bearing B is well known in the art In FIG. 1a, d indicates an inner diameter, Li indicates a diameter at the shoulder of the inner ring 3, Do indicates a diameter at the shoulder of the outer ring 1, and D is an outer diameter of the bearing B.

It will be noted that the term "bearing space capacity" used hereinafter means a residual space capacity obtained by subtracting the volumes of balls and retainers from the space capacity surrounded by the inner and outer rings and the shield.

In the practice of the invention, a specific type of grease composition is filled in the bearing space capacity to provide a rolling device. The grease composition comprises a base oil made of a carbonate and a thickening agent made of a lithium soap, to which there is further added at least one organomolybdenum compound selected from the group consisting of a molybdenum dithiophosphate of the general formula (ii)

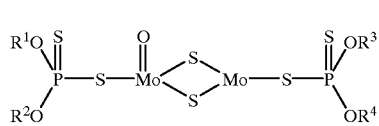

(ii)

wherein $R^1$, $R^2$, $R^3$ and $R^4$ independently represent an alkyl group having from 1 to 24 carbon atoms or an aryl group having from 6 to 30 carbon atoms, and a molybdenum dithiocarbamate of the general formula (iii)

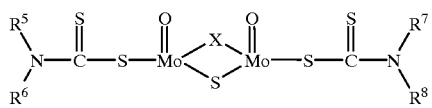

(iii)

wherein $R^5$, $R^6$, $R^7$ and $R^8$ independently represent an alkyl group having from 1 to 24 carbon atoms, and X represents O or S. The rolling device having such a grease composition as defined above exhibits good characteristics when used as a bearing for information devices and does not cause fretting to occur.

When a grease is sealed, which makes use, as a base oil, of a carbonate compound of the general formula (i)

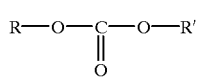

(i)

wherein R and R' may be the same or different and independently represent a branched alkyl group having from 13 to 15 carbon atoms, in a rolling device, characteristic properties required for information devices, e.g a small torque, an excellent acoustic characteristic, a long life, a reduced degree of dusting (scattering) of the grease and the like, can be imparted to the device without causing fretting to occur The carbonate used as the base oil of the grease composition in the rolling device of the invention is represented by the afore-indicated formula (i) wherein R and R' may independently be a branched alkyl group having from 13 to 15 carbon atoms Specific examples include the compounds of the following formulas (v), (vi) and (vii)

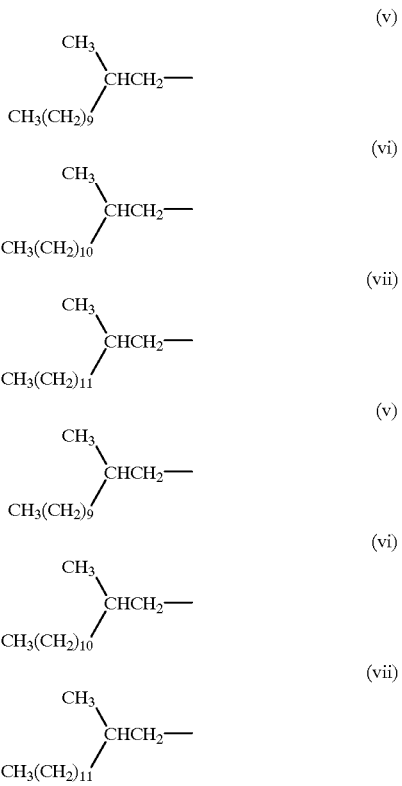

The grease composition sealed in the rolling device of the invention should preferably comprise 75 to 95 parts by weight of the carbonate and 5 to 30 parts by weight of a lithium metal salt.

If the content of the lithium metal salt is less than 5 parts by weight, the mixing consistency becomes undesirably soft, and the resultant mixture leaks or is scattered at the time of rotation of the rolling device, with the possibility that HDD, FDD and the like devices are contaminated.

On the other hand, when the content exceeds 30 parts by weight, the resultant mixture becomes so hard that the fluidity of the grease composition inside the rolling device becomes poor. This may unfavorably lead to a failure in lubrication.

The at least one organomolybdenum compound selected from the molybdenum dithiophosphate and the molybdenum dithiocarbamate should preferably be present in an amount of 0.5 to 5 wt %, more preferably from 1 to 3 wt %, based on the grease composition used in the present invention.

Further, the grease composition sealed in the rolling device of the invention may comprise additives ordinarily employed in grease compositions, such as antioxidants, rust inhibitors and the like.

In the practice of the invention, the materials for the outer member, inner member and rolling bodies used in the rolling device of the invention may be high performance chromium bearing steels, highly anti-corrosive martensite stainless steels and the like. The high performance chromium bearing steels include high-quality, vacuum-degassed, high performance chromium bearing steels such as JISG4805 SUJ2 and AISI/SAE52100, and the martensite stainless steels include DD400, SUS440C (corresponding to JISG430344C and AISI440C, respectively).

The rolling bodies may be, aside from those mentioned above, boron nitride ceramics.

Embodiments of the invention are summarized below.

(1) A rolling device comprises a plurality of rolling bodies provided between an outer member having a first contact face with each of the plurality of rolling bodies and an inner member having a second contact face with each of the plurality of rolling bodies, the plurality of rolling bodies individually being able to roll relative to the first and second faces, wherein a grease composition is sealedly filled inbetween the outer member and the inner member and comprises:

a carbonate compound of the following general formula (i) serving as a base oil

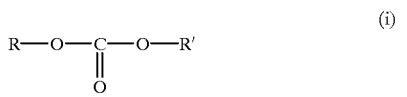

wherein R and R' may be the same or different and independently represent a branched alkyl group having from 13 to 15 carbon atoms;

a lithium soap serving as a thickener; and at least one organomolybdenum compound selected from the group consisting of a molybdenum dithiophosphate of the general formula (ii)

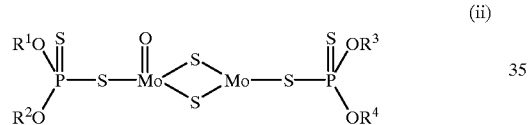

wherein $R^1$, $R^2$, $R^3$ and $R^4$ independently represent an alkyl group having from 1 to 24 carbon atoms or an aryl group having from 6 to 30 carbon atoms, and a molybdenum dithiocarbamate of the general formula (iii)

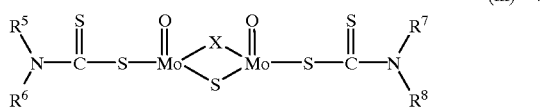

wherein $R^5$, $R^8$, $R^7$ and $R^8$ independently represent an alkyl group having from 1 to 24 carbon atoms, and X represents O or S.

(2) The device as recited in (1) above, wherein the base oil is made of a carbonate compound of the following general formula (i)

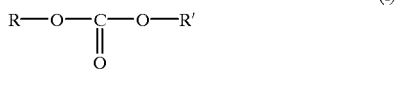

wherein R and R' may be the same or different and independently represent a branched alkyl group of the following general formula (iv)

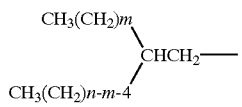

wherein n=13 to 15 and m=0 to 6.

(3) A device as recited in (1) or (2) above, wherein the rolling bodies are each made of a spherical body or ball.

(4) A device as recited in any one of (1) to (3) above, wherein the rolling bodies are each made of a cylindrical roller.

(5) A device as recited in any one of (1) to (4) above, wherein the grease composition comprises 70 to 95 parts by weight of the carbonate compound of the general formula (i),

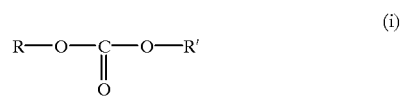

wherein R and R' may be the same or different and independently represent a branched alkyl group of the following general formula (iv).

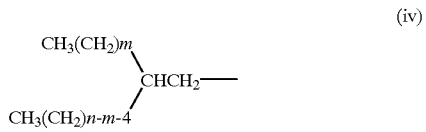

wherein n=13 to 15 and m=0 to 6, and 5 to 30 parts by weight of the lithium soap (6) A device as recited in any one of (1) to (5) above, wherein the lithium soap consists of a lithium metal salt prepared from lithium hydroxide and a higher fatty acid having no less smaller than 10 carbon atoms or a higher hydroxy fatty acid having at least one hydroxyl group and holes than 10 carbon atoms.

(7) A device as recited in any one of (1) to (6) above, wherein the thickening agent is made of a mixture of lithium metal salts.

(8) A device as recited in any one of (1) to (7) above, further comprising additives as a fourth component.

(9) A device as recited in any one of (1) to (8) above, wherein the at least one organomolybdenum compound is present in an amount of 0.5 to 5 wt %, preferably from 1 to 3 wt %, based on the grease composition.

The invention is described in more detail by way of examples.

Preparatory Examples of Grease Compositions

Examples 1 to 8 for grease compositions used in a rolling device for information devices are described.

A carbonate (hereinafter referred to as carbonate oil A) of the chemical formula (viii), which has a branched alkyl group and corresponds to a compound of the afore-indicated formula (i) in which R' is the group of the formula (vii),

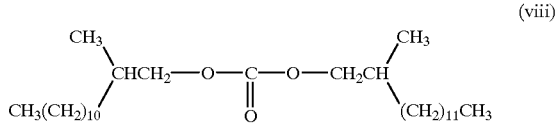

(viii)

and lithium stearate and/or lithium 12-hydroxystearate were mixed at a ratio indicated in Table 1 so that the total amount was at 100 wt %. While agitating the mixture until the mixture was entirely turned into a liquid, it was heated to 220° C. to 230° C. The liquid was poured into a stainless steel container in a thickness of 3 to 5 mm and cooled down to 80° C. or below, after which a molybdenum dithiophosphate or molybdenum dithiocarbamate was added to as an organomolybdenum compound. Subsequently, the mixture was homogenized by means of a three-roll mill to obtain a grease composition.

Likewise, aside from the carbonate, lithium soap component and organomolybdenum compound, an alkyl diphenyl ether or a polyol ester was used and formulated at a ratio indicated in Table 1 to obtain grease compositions of Examples 7 and 8.

Preparatory Examples of Comparative Grease Compositions

For comparison, two types of commercially available greases whose base oils and thickening agents were, respectively, known were provided as Comparative Examples 1 and 2. In Table 2, the symbol "+" indicates formulated components.

Moreover, the base oil and lithium soap were formulates at the different ratios indicated in Table 2, and treated in the same manner as in the examples, thereby obtaining grease compositions as Comparative Examples 3, 4, respectively.

The grease compositions of the examples and comparative examples were subjected to measurement of a mixing consistency and a dropping point and also to a motor characteristic test under the same conditions.

The mixing consistency was determined according to the method described in JIS K2220 5.3 and the dropping point was determined according to the method described in JIS K2 220 5.4.

The motor characteristic test was performed such that a bearing, in which a grease composition to be tested was sealed, was assembled in a spindle motor, and the motor was rotated at normal temperatures at 5,400 r.p.m, to measure noises, an amount of a grease evaporated (scattered), and a torque of rotations.

The noises were measured by use of a microphone located at a distance of 1 m from the end face of a hub of the motor at the time of the rotations of the motor.

The amount of an evaporated (scattered) grease was determined by measuring the weights of the motor prior to and after the rotations and calculating the difference in the weight. The torque was determined by measuring a current value at the time of the rotations of the motor by means of an ammeter, and the torque stability was calculated from the difference between the maximum current value and the minimum current value.

The results of judgement on the respective evaluation items, which were accorded to the performances required for a bearing grease composition for information devices, are shown in Table 4.

Smaller noise value, a more reduced amount of evaporation (scattering), a lower torque, and a smaller variation of the torque stability are, respectively, better.

The respective performances were evaluated by the three ranks of "good", "moderate" and "poor".

Rolling ball bearings, which were, respectively, filled with the grease compositions to 10 to 15 vol % of the bearing space capacity defined before, were vibrated at 9 Hz and applied with an angular acceleration of 29.3 radians/second$^2$ under which a generated sound was measured over 60 minutes. The results are shown in Table 3.

The overall evaluation as a bearing for information devices was made by four ranks of "excellent", "good", "moderate" and "poor", with the results shown in Table 4.

TABLE 1

| Preparatory Example | | 1 | 2 | 3 | 4 | 5 | 6 | 7 | 8 |
|---|---|---|---|---|---|---|---|---|---|
| Thickening Agent | StLi | 25 | | 25 | 25 | 25 | 15 | 20 | 20 |
| | 120H StLi | | 10 | | | | 5 | | |
| Base Oil | carbonate A | 75 | 90 | 75 | 75 | 75 | 80 | 70 | 70 |
| | ADE | | | | | | | 10 | |
| | POE | | | | | | | | 10 |
| OrganoMolybdenum | MoDTP | 1 | 1 | | 0.5 | 1.5 | 2 | 1 | 1 |
| | MoDTC | | | | | 1.5 | | | |
| Viscosity of Base Oil (40° C.) | | 18 | 18 | 18 | 18 | 18 | 18 | 25 | 21 |
| Mixing consistency (25° C.) | | 199 | 250 | 200 | 210 | 207 | 185 | 212 | 209 |
| Dropping Point (° C.) | | 198 | 195 | 201 | 197 | 195 | 195 | 196 | 195 |

Note:
StLi: lithium stearate
12OH StLi: lithium 12hydroxystearate
ADE: alkyl diphenyl ether
POE: polyol ester oil

TABLE 2

| Commercial Products & Comparative Preparatory Examples | | 1 | 2 | 3 | 4 |
|---|---|---|---|---|---|
| Thickening Agent | StLi | + | | 25 | 25 |
| | 120H StLi | + | | | |
| | Na-complex | | + | | |
| Base | carbonate A | | | 75 | |
| | Diester | + | | | 38 |
| | POE | + | | | 37 |
| | Mineral oil | | + | | |
| OrganoMoly- | MoDTP | | | | 1 |

TABLE 2-continued

| Commercial Products & Comparative Preparatory Examples | 1 | 2 | 3 | 4 |
|---|---|---|---|---|
| bdenum MoDTC | | | | |

Note:
Na-Complex: sodium complex soap
12OH St-Li: lithium 12hydroxystearate
POE: polyol ester oil.
It should be noted that in Tables 1, 2, the unit of the viscosity of the base oil is mm2/S.

TABLE 3

| Example | Grease | Amount of Mo | After 0 minute | After 1 minutes | After 3 minutes | After 5 minutes | After 10 minutes | After 30 minutes | After 60 minutes |
|---|---|---|---|---|---|---|---|---|---|
| 1 | Preparatory Example 4 | 0.5 | 25 mG | 26 mG | 26 mG | 26 mG | 26 mG | 26 mG | 27 mG |
| 2 | Preparatory Example 1 | 1.0 | 25 | 26 | 26 | 26 | 26 | 27 | 28 |
| 3 | Preparatory Example 6 | 2.0 | 25 | 26 | 26 | 26 | 26 | 27 | 28 |
| 4 | Preparatory Example 5 | 3.0 | 25 | 25 | 25 | 26 | 26 | 27 | 27 |
| For comparison | Comparative Example | 1.0 | 36 | 26 | 27 | 28 | 30 | 31 | 35 |

Note:
The amount of molybdenum is expressed by parts by weight relative to 100 parts by weight of the total of a base oil and a thickening agent.

TABLE 4

| Example | Torque Characteristic | Noise Characteristic | Scattering (Dusting) Characteristic | Fretting Resistance | Overall Evaluation |
|---|---|---|---|---|---|
| 1 | good | good | good | good | excellent |
| 2 | good | good | good | good | excellent |
| 3 | good | good | good | good | excellent |
| 4 | good | good | good | good | excellent |
| Comparative Example | moderate | poor | good | poor | poor |

As will be apparent from Tables 1 to 4, the bearings of the invention are reduced in the amount of the evaporated (scattered)grease, low in noise value and torque, and have a stable torque. In addition, the bearings do not undergo any fretting phenomenon.

What is claimed is:

1. A rolling device comprising a plurality of rolling bodies provided between an outer member having a first contact face with each of the plurality of rolling bodies and an inner member having a second contact face with each of the plurality of rolling bodies, the plurality of rolling bodies individually being able to roll relative to the first and second faces, wherein a grease composition is sealedly filled inbetween said outer member and said inner member and comprises:

a carbonate compound of the following general formula (i) serving as a base oil

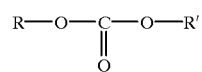

wherein R and R' may be the same or different and independently represent a branched alkyl group having from 13 to 15 carbon atoms;
a lithium soap serving as a thickener; and
at least one organomolybdeniun compound selected from the group consisting of a molybdenum dithiophosphate of the general formula (ii)

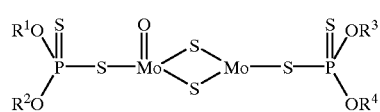

wherein $R^1$, $R^2$, $R^3$ and $R^4$ independently represent an alkyl group having from 1 to 24 carbon atoms or an aryl group having from 6 to 30 carbon atoms, and a molybdenum dithiocarbamate of the general formula (iii)

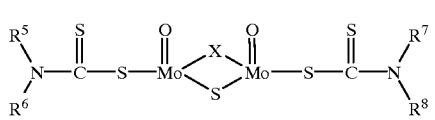

wherein $R^5$, $R^6$, $R^7$ and $R^8$ independently represent an alkyl group having from 1 to 24 carbon atoms, and X represents O or S.

2. A device according to claim 1, wherein said base oil is made of a carbonate compound of the following general formula (i)

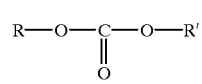

wherein R and R' may be the same or different and independently represent a branched alkyl group of the following general formula (iv)

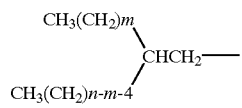

wherein n=13 to 15 and m=0 to 6.

3. A device according to claim 1, wherein said rolling bodies are each made of a spherical body or ball.

4. A device according to claim 1, wherein the rolling bodies are each made of a cylindrical roller.

5. A device according to claim 1, wherein said grease composition comprises 70 to 95 parts by weight of said carbonate compound of the general formula (i), and 5 to 30 parts by weight of said lithium soap

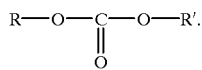

6. A device according to claim 1, wherein said lithium soap consists of a lithium metal salt prepared from lithium hydroxide and a higher fatty acid having not smaller than 10 carbon atoms or a higher hydroxy fatty acid having at least one hydroxyl group and not smaller than 10 carbon atoms.

7. A device according to claim 1, wherein said thickening agent is made of a mixture of lithium metal salts.

8. A device according to claim 1, further comprising additives as a fourth component.

9. A device according to claim 1, wherein the at least one organomolybdenum compound is present in an amount of 0.5 to 5 wt % based on the grease composition.

10. In a rolling device used in spindle motors in an information device and comprising a plurality of rolling bodies provided between an outer member having a first face in contact with each of the plurality of rolling bodies and an inner member having a second face in contact with each of the plurality of rolling bodies, each of the plurality of rolling bodies being able to roll relative to the first and second faces, the improvement characterized in that a grease composition comprising:

a carbonate compound of formula (i) serving as a base oil

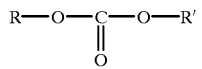

wherein R and R' may be the same or different and independently represent a branched alkyl group having from 13 to 15 carbon atoms;

a lithium soap serving as a thickener; and at least one organomolybdenum compound selected from the group consisting of a molybdenum dithiophosphate of formula (ii)

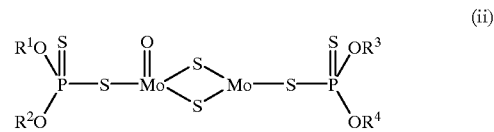

wherein $R^1$, $R^2$, $R^3$ and $R^4$ independently represent an alkyl group having from 1–24 carbon atoms or an aryl group having from 6 to 30 carbon atoms, and a molybdenum dithiocarbamate of formula (iii)

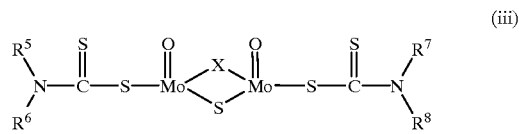

wherein $R^5$, $R^6$, $R^7$ and $R^8$ independently represent an alkyl group having from 1 to 24 carbon atoms, and X represents O or S, is sealedly filled in between said outer member and said inner member.

11. A rolling device according to claim 10, wherein said information device is selected from the group consisting of a hard disk drive, a floppy disk drive, a compact disk drive, a magneto-optical disk drive and video tape recorder.

12. A rolling device according to claim 10, wherein said rolling bodies are made of a material selected from the group consisting of chromium steel, a martensite stainless steel and boron-nitride.

13. A rolling device according to claim 10, wherein at least one organomolybdenum compound is present in the grease composition in an amount of from 0.5 to 5 wt. %.

14. A rolling device according to claim 10, wherein the grease composition comprises 70 to 95 parts by weight of the carbonate compound and 5 to 30 parts by weight of the lithium soap.

* * * * *